United States Patent [19]
Motto et al.

[11] Patent Number: 5,144,205
[45] Date of Patent: Sep. 1, 1992

[54] COMPACT FLUORESCENT LAMP DIMMING SYSTEM

[75] Inventors: Eric R. Motto, Center Valley; Scott R. Jurell, Hellertown, both of Pa.

[73] Assignee: Lutron Electronics Co., Inc., Coopersburg, Pa.

[21] Appl. No.: 450,185

[22] Filed: Dec. 12, 1989

Related U.S. Application Data

[63] Continuation-in-part of Ser. No. 353,984, May 18, 1989.

[51] Int. Cl.[5] ...................... H05B 37/00; H05B 41/14
[52] U.S. Cl. ..................... 315/244; 315/199; 315/174; 315/176; 315/DIG. 7; 315/DIG. 2
[58] Field of Search ............... 315/244, 210, 119, 199, 315/172, 174, 176, DIG. 7, 224, DIG. 2, 258

[56] References Cited

U.S. PATENT DOCUMENTS

| | | | |
|---|---|---|---|
| 3,619,716 | 11/1971 | Spira et al. | 315/244 |
| 3,731,142 | 5/1973 | Spira et al. | 315/94 |
| 4,187,448 | 2/1980 | Kuroi et al. | 315/176 |
| 4,350,935 | 9/1982 | Spira et al. | 315/291 |
| 4,362,971 | 12/1982 | Sloan, Jr. | 315/DIG. 5 X |
| 4,388,561 | 1/1983 | Koshimura et al. | 315/174 |
| 4,630,005 | 12/1986 | Clegg et al. | 315/DIG. 7 |
| 4,641,061 | 2/1987 | Munson | 315/210 |
| 4,651,060 | 3/1987 | Clark | 315/199 |
| 4,663,569 | 5/1987 | Alley et al. | 315/175 |
| 4,663,570 | 5/1987 | Luchaco et al. | 315/219 |
| 4,853,598 | 8/1989 | Kusko et al. | 315/101 |
| 4,890,039 | 12/1989 | Nilssen | 315/244 |
| 4,945,278 | 7/1990 | Chern | 315/209 R |

OTHER PUBLICATIONS

May & Christe GMBH Transormatarenwerke brochure.
Welding Power Handbook, Union Carbide.
Cherry/Gas Plasma Displays brochure.
Luciano DiFraia, "A Method to Achieve Continuous Dimming of Low Pressure Sodium and Other Gas Discharge Lamps" *Journal of IES* (Jul. 1981), pp. 245-252.

*Primary Examiner*—Eugene R. LaRoche
*Assistant Examiner*—Son Dinh
*Attorney, Agent, or Firm*—Seidel, Gonda, Lavorgna & Monaco

[57] ABSTRACT

A dimming system provides power from a switch-controlled power source in series with a leakage auto-transformer to a compact fluorescent lamp. The system incorporates a high-frequency resonant converter that provides high voltages to strike and maintain an electric discharge in the lamp. The converter is loaded in parallel by the lamp, whose impedance damps the converter to stabilize lamp operation. An inductor, connected between the leakage auto-transformer and the resonant converter, isolates the switch-controlled power source from the high-frequency voltage. The system can be used with a variety of standard leakage reactance auto-transformers to provide full-range dimming of compact fluorescent lamps from 5 to 100 percent light output with minimal flicker.

26 Claims, 9 Drawing Sheets

FIG. 1

STRIKING VOLTAGE

COMPACT FLUORESCENT LAMP DIMMING SYSTEM

CROSS REFERENCE TO RELATED APPLICATION

This application is a continuation-in-part of co-pending U.S. application Ser. No. 353,984, filed May 18, 1989, and entitled "Gas Discharge Lamp Dimming System."

BACKGROUND OF THE INVENTION

1. Field of the Invention

This invention relates to dimming of gas discharge lamps and, more particularly, to dimming of compact fluorescent lamps.

2. Description of the Related Art

Continuous dimming of lighting is desirable for a number of reasons. It can change the "atmosphere" in an illuminated space; it can provide different lighting levels for different activities in the space; and it can adjust the electrical lighting in a space to compensate for variations in natural lighting.

Various means are known for controlling most light sources. One such lighting control operates by periodically blocking the supply voltage to the light source in accordance with a phase delay during each half cycle of an ac applied voltage. These "phase control dimmers," as they are commonly referred to, generally employ a thyristor, such as a silicon controlled rectifier (SCR) or, more commonly, a triac as an electronic blocking device or switch. Gate turn off devices, and bipolar and MOSFET transistors have also found limited use in phase control circuits, but triacs are prevalent.

A triac normally has three terminals—a cathode, an anode and a gate (or control terminal). Current may be injected into or drawn out of the gate to fire the triac (i.e., make it bi-directionally conductive). Once fired, a triac will remain conductive until the current through it drops below a certain level known as the holding current. By firing the triac at some adjustable phase delay after each zero crossing of the (generally sinusoidal) applied voltage, one can vary the brightness of a light source.

One type of commonly used light source that has been historically difficult to dim is the gas discharge lamp. A gas discharge lamp is generally an elongated gas-filled (usually low pressure mercury vapor) tube that has electrodes at each end. The steady-state operation of a gas discharge lamp is as follows: The electrodes are heated to a temperature which causes thermionic emission of electrons into the tube. A voltage applied between the electrodes accelerates the electrons toward the anode. En route to the anode, the electrons collide with gas atoms to produce positive ions and additional electrons. The electrons continue to stream toward the anode and the positive ions toward the cathode, sustaining an electric arc in the tube and heating the electrodes. (If the applied power is ac, the electrodes reverse polarity during each half cycle.) Because each collision produces additional electrons, increases in the arc current cause the impedance of the lamp to decrease;, a characteristic known as "negative resistance." Operation of the lamp is inherently unstable, due to this negative resistance characteristic, and current between the electrodes must be limited to avoid damaging the lamp.

Typically, fixtures designed to operate gas discharge lamps include a current limiting element (a "ballast") in series with the lamp. A ballast is an impedance and can simply be a resistor. More commonly, a reactive impedance, such as an inductor or a combination of inductors and capacitors, is used, since it is a more efficient ballast when the applied potential is ac. A ballast limits the current through the lamp during steady-state operation, but provides a high voltage during lamp start-up to strike the arc.

During lamp start-up, the electrodes of a conventional ("cold cathode") gas discharge lamp are cold and there are almost no free electrons in the tube. The impedance of the lamp is very high, and the voltage required to initiate or strike an arc far exceeds that required to sustain the arc. This exceedingly high voltage that is required to strike an arc between the cold electrodes can damage them and reduce the life of the lamp. To reduce the damaging effects of lamp start-up and increase thermionic emission of electrons during steady-state operation, many lamps, such as the "rapid start" lamp which is widely used in the U.S., have electrodes that are heated by a separate circuit that operates independently from the arc current. The electrodes of such lamps typically consist of a tightly wound coil of tungsten coated with a thermo-emissive material. Current that flows through the coil between terminals on either side of the coil raise its temperature and cause it to thermionically emit electrons.

Ballasts designed to operate rapid start lamps typically consist of a leakage reactance auto-transformer with separate windings to provide low voltage across each electrode coil—to heat the coil—and high voltage between the electrodes—to induce an electric discharge through the lamp. Leakage inductance in the high voltage winding limits the current through the lamp during steady-state operation. The low voltage windings provide additional power to heat the electrodes during lamp operation to ensure sufficient thermionic emission. In this specification and appended claims, we refer to a leakage reactance auto-transformer as a leakage auto-transformer. Furthermore, when referring to electrical elements, the term "connected" is understood to mean that there exists between two or more elements a conductive path, which may include additional elements not explicitly recited.

If a rapid start lamp is dimmed using a phase controlled voltage and rapid start ballast, not enough voltage is provided across the electrode coils at low power levels resulting in insufficient thermionic emission at the cathode. This limits low end dimming capability to approximately 60 percent of full light output. Furthermore, the temporary absence of arc current during the phase delay necessitates restriking the arc during each half cycle, which shortens lamp life. For these reasons, phase control dimmers generally have not been used for full range dimming of rapid start lamps.

A number of control systems have been devised for the control of gas discharge lamps. Luciano Di Fraia suggested, in a paper presented to the IES 1980 annual conference, that gas discharge lamps may be dimmed by varying the frequency of the voltage provided to the lamp and a series-connected rapid start ballast. As the frequency is increased, the power transferred through the high voltage winding of the ballast decreases, because of its high leakage inductance. The low voltage windings, however, have significantly less leakage inductance and provide a voltage across the electrode coils that keeps the electrodes heated. Unfortunately, variable frequency controls are expensive and inefficient. They also produce a high level of electromagnetic interference if switching transistors are used.

U.S. Pat. No. 4,853,598, issued Aug. 1, 1989, to Kusko et al., incorporated herein by reference, describes a circuit for dimming a low wattage fluorescent lamp. The dimming circuit includes a rectifier circuit, a transformer having at least a primary and a pair of secondary windings, a resonant circuit connected between the transformer and the lamp, and a dc frequency converter for applying a high-frequency pulsating dc potential across the primary winding.

U.S. Pat. Nos. 3,619,716 and 3,731,142, incorporated herein by reference, teach dimming of gas discharge lamps with a single high-frequency power switching device and a pulse forming network connected across the lamp. By keeping the conduction time of the switching device short compared with the lamp arc time-constant, lamp current runaway is avoided. A pulse forming network stores energy and allows it to circulate through the arc when the switching device is not conductive, thus keeping the arc struck. These inventions have been embodied in the Hi-Lume ® electronic dimming ballast, sold by Lutron Electronics Co., Inc. It operates as follows: Control circuitry rectifies and filters voltage dropped across a current sensing resistor placed in series with the lamp arc current, and compares this voltage with the dimming control voltage input. The duty cycle of the single power switching device (a switching transistor) is adjusted until the voltage across the sensing resistor equals the dimming control voltage. The use of an accurate servo feedback loop, which directly monitors the lamp arc current, results in very stable dimming capability over a range in excess of 100 to 1 light output ratio.

Oy Helvar, of Helsinke, Finland, manufactures an electronic dimming ballast that rectifies a phase controlled voltage and converts it into a high-frequency voltage which is applied between the lamp electrodes. The light output of the lamp is determined by the power supplied to the electronic ballast by a phase control dimmer. Although the electronic ballast may offer certain advantages, it suffers from a number of drawbacks, such as high voltage (750 V) placed across the phase control dimmer and insufficient striking voltages at low power levels.

There is a need for a gas discharge lamp dimmer that works with standard magnetic ballasts and that provides dimming control over a wide illumination range.

SUMMARY OF THE INVENTION

According to the present invention, a gas discharge lamp dimming system uses a switch-controlled power source and standard magnetic ballasts to provide full-range dimming of gas discharge lamps from 3 to 100 percent light output with minimal striations, lamp drop out, and flicker. A switch-controlled power source may be a phase controlled dimmer, whereby current is blocked from an ac source during a first period of each half cycle and conducted during the remaining period of each half cycle. Other switch-controlled power sources include reverse phase control, notch phase control, and pulse-width-modulated dc dimmers. A reverse phase control dimmer is similar to the phase control dimmer described above except that the blocking and conductive periods are reversed (refer to U.S. patent application Ser. No. 133,712, filed Dec. 16, 1987, incorporated herein by reference). A notch phase control dimmer conducts current from an ac source during periods both at the beginning and the end of each half cycle and blocks current during a period between, but not including, adjacent zero crossovers (refer to U.S. Pat. No. 4,350,935, issued Sep. 21, 1982, incorporated herein by reference). A pulse-width-modulated dc dimmer alternately blocks and conducts current from a dc source, adjusting the ratio of conduction time to blocking time.

The present invention includes a circuit for providing low-level current flow between the electrodes to sustain an electric discharge in the lamp when the switch-controlled power source alone is insufficient. Preferably, the current is high-frequency; however, line-frequency or dc current flow may be provided, instead.

In one embodiment of the present invention, a control system for providing electrical power from a source to a gas discharge lamp comprises:

a) a resonant circuit having input and output terminals, said lamp being connectable across said output terminals to provide parallel loading of said resonant circuit; and b) driving means to provide a symmetrical high-frequency ac driving voltage across said input terminals to achieve a resonant response in said resonant circuit and produce a voltage across said output terminals sufficient to strike and maintain an electric discharge in said lamp.

In another embodiment of the present invention, a control system for providing electrical power from a source to a gas discharge lamp comprises:

a) a ballast connected between said source and said lamp to provide a first current at a first frequency from said source to said lamp, substantially determining the power thereto;

b) means connected between said source and said lamp to simultaneously provide a second current at a second frequency, higher than said first frequency, from said source to said lamp to maintain an electric discharge therein; and c) a first inductor connected between said lamp and said ballast to substantially block said second current from propagating through said ballast.

In another embodiment of the present invention, a control system for providing electrical power from a source to a gas discharge lamp comprises:

a) a resonant circuit having input and output terminals, said lamp connectable across said output terminals to provide parallel loading of said resonant circuit;

b) driving means for providing a high-frequency driving voltage across said input terminals to achieve a resonant response in said resonant circuit and produce a voltage on said output terminals sufficient to strike and maintain an electric discharge in said lamp;

c) means connected to said resonant circuit for sensing when said resonant response exceeds a predetermined response; and d) means connected to said driving means and responsive to said sensing means for shifting the frequency of said driving voltage away from the peak response frequency of said resonant circuit when said resonant response exceeds said predetermined response;

whereby the voltage across said output terminals remains below a predetermined maximum value.

In another embodiment of the present invention, a control system for providing electrical power from a source to two gas discharge lamps comprises:

a) a pair of ballasts, each connected between said source and a corresponding one of said lamps, to provide a first current at a first frequency from said source to said lamps in parallel, substantially determining the power thereto;

b) a resonant circuit connected between said source and said lamps to simultaneously provide a second current at a second frequency, higher than said first frequency, from said source to said lamps in series to maintain an electric discharge therein;

c) driving means to provide a driving voltage across said resonant circuit sufficient to achieve a resonant response therein; and d) first and second inductors, each connected between one of said lamps and said corresponding ballast, to substantially block said second current from propagating through said ballasts.

DETAILED DESCRIPTION OF THE INVENTION

Figure 1:
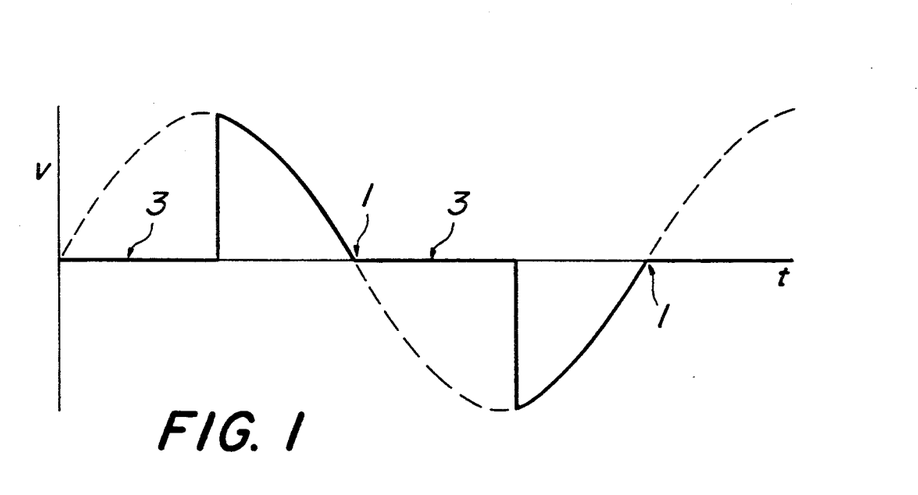
FIG. 1 shows a typical phase control waveform.
Figure 2:
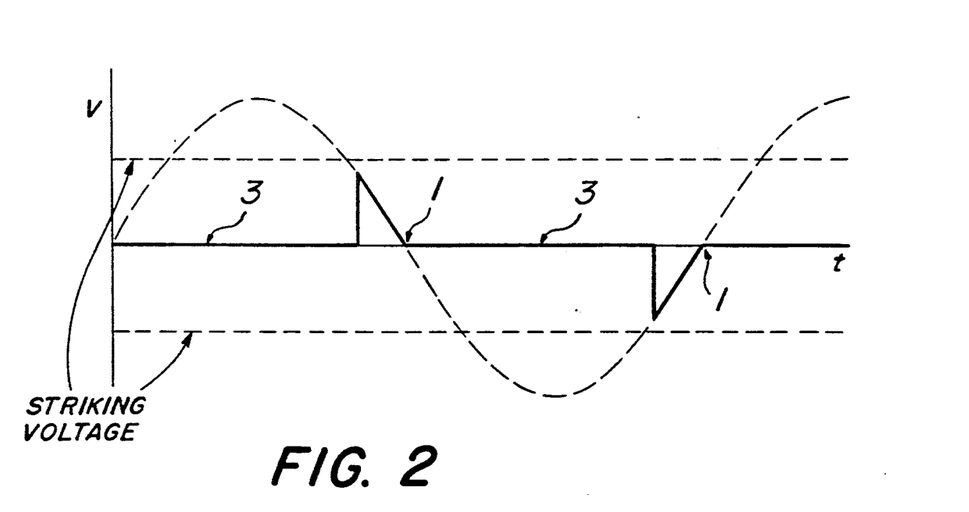
FIG. 2 illustrates insufficient striking voltage that occurs at low power levels.

FIG. 1 illustrates a typical phase control waveform. After each zero crossing 1 there is a period of time 3 (phase delay) during which the voltage remains at zero. When this voltage waveform is applied between the electrodes of a gas discharge lamp, the arc extinguishes itself during each phase delay 3, after about a millisecond, and the lamp has to be restruck during each subsequent half cycle. This shortens the life of the lamp. If this voltage is provided to a rapid start lamp and ballast, the RMS voltage across each electrode coil is reduced as the phase delay increases causing the electrodes to run cooler and making the lamp more difficult to restrike. If the phase delay is long, the peak voltage of the phase control waveform is not large enough to restrike the lamp (see FIG. 2), causing lamp "drop out" at low power levels.

A method of applying high-frequency voltage to a rapid start ballast during the phase delay to maintain sufficient RMS voltage across the electrode coils over a wide dimming range was disclosed in U.S. Pat. No. 4,651,060, issued Mar. 17, 1987, to Clark, incorporated herein by reference. According to that patent, a phase control circuit controls application of an ac voltage to the lamp and ballast so that voltage is applied for only a selectable period of time during each half cycle. During the remaining portion of each half cycle, a high-frequency square wave is supplied to the rapid start ballast. The high-frequency voltage is substantially blocked from the lamp electrodes by leakage inductance in the high-voltage winding of the rapid start ballast. However, the low voltage windings have only a small leakage inductance and, hence, provide the high-frequency voltage across the electrode coils to keep them hot. In this way the electrodes remain heated over a wide range of power levels, but current flows between the electrodes and, consequently, the brightness of the lamp are substantially determined by the phase controlled voltage.

Figure 3:
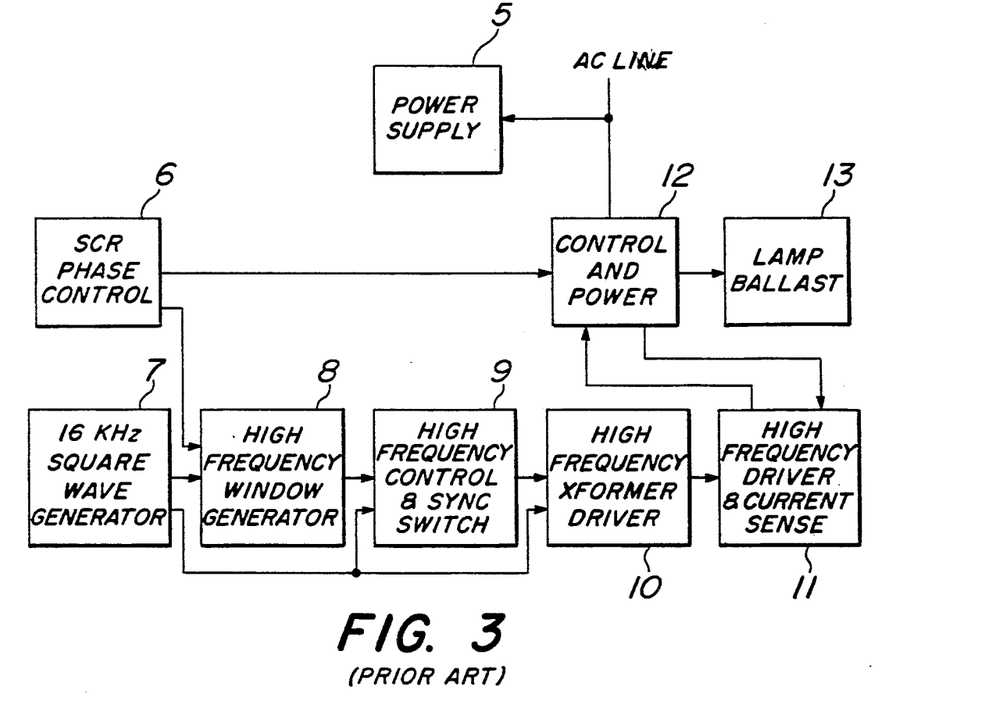
FIG. 3 is a block diagram of a prior art gas discharge lamp dimmer.

FIG. 3 is a block diagram of the lamp dimmer disclosed in the above patent. An SCR phase control circuit generates signals to control the relative "on" and "off" times of the ac supply voltage and applies these signals to the control and power circuitry 12, where the applied voltage is formed by SCRs or a triac.

A 16 kHz square wave, triggered by the high-frequency window generator 8, is applied to the lamp ballast 13 during the phase delay. The high-frequency window generator 8 receives an input signal from the SCR phase control 6 and from the 16 kHz square wave generator 7 and produces an output signal indicating when the square wave should be applied to the lamp. That output signal includes a time delay to insure that the square wave does not overlap the driving voltage.

A square wave having the same peak-to-peak voltage as the line ac wave and having a 50 percent duty cycle is provided to the ballast. The pulse width control and synchronizing switch 9 adjusts the duty cycle of the square wave and synchronizes the signal so that a square wave does not start or end in the middle of a cycle.

The high-frequency transformer driver 10 receives a signal when the high-frequency square wave is to be applied to the lamp and also receives the 16 kHz square wave from the square wave generator 7. The driver transmits the 16 kHz square wave during the desired period and supplies it to the current sense circuitry 11, which converts the signal into an amplified voltage and supplies it to the control and power circuitry 12. It is then combined with the power signal and is applied to the lamp ballast 13. Although the above-described method, used with some types of ballasts, may provide sufficient power to heat the lamp electrodes for various phase delays, most ballasts are not designed to operate at high frequencies, and the results may be unpredictable. Because the arc is allowed to extinguish during each phase delay, restriking is necessary at the start of each half cycle reducing lamp life. Furthermore, 16 kHz is well within the audible range of most humans, and resonance in the windings of some ballasts may cause an annoying audible noise.

One embodiment of the present invention continuously provides low-level current flow between the electrodes of a phase controlled gas discharge lamp to sustain an electric discharge in the lamp when the phase controlled current alone is insufficient. This low-level current is preferably high-frequency, although line-frequency or dc may alternatively be used.

Figure 4:
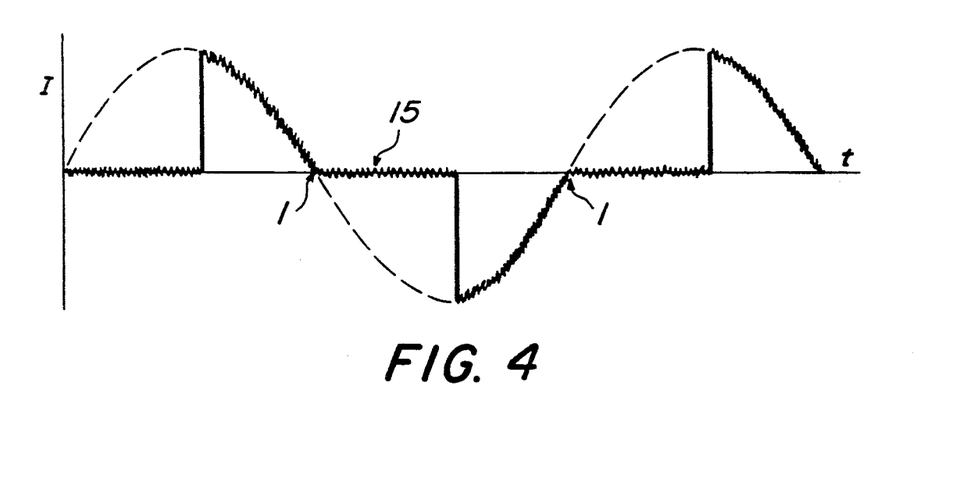
FIG. 4 is a phase control waveform of the present invention.

FIG. 4 illustrates the resulting current flowing between the lamp electrodes when the phase control waveform of FIG. 1 is combined with a low-level, high-frequency current. The high-frequency component 15, sustains an electric discharge through the lamp during each phase delay. Alternatively, low-level, high-frequency current flow may be provided between the electrodes only during the phase delays. The high-frequency current preferably provides approximately three percent of full power to the lamp. Preferably a separate circuit provides voltage across the electrode coils to ensure sufficient heating of the electrodes for a range of power levels.

Figure 5:
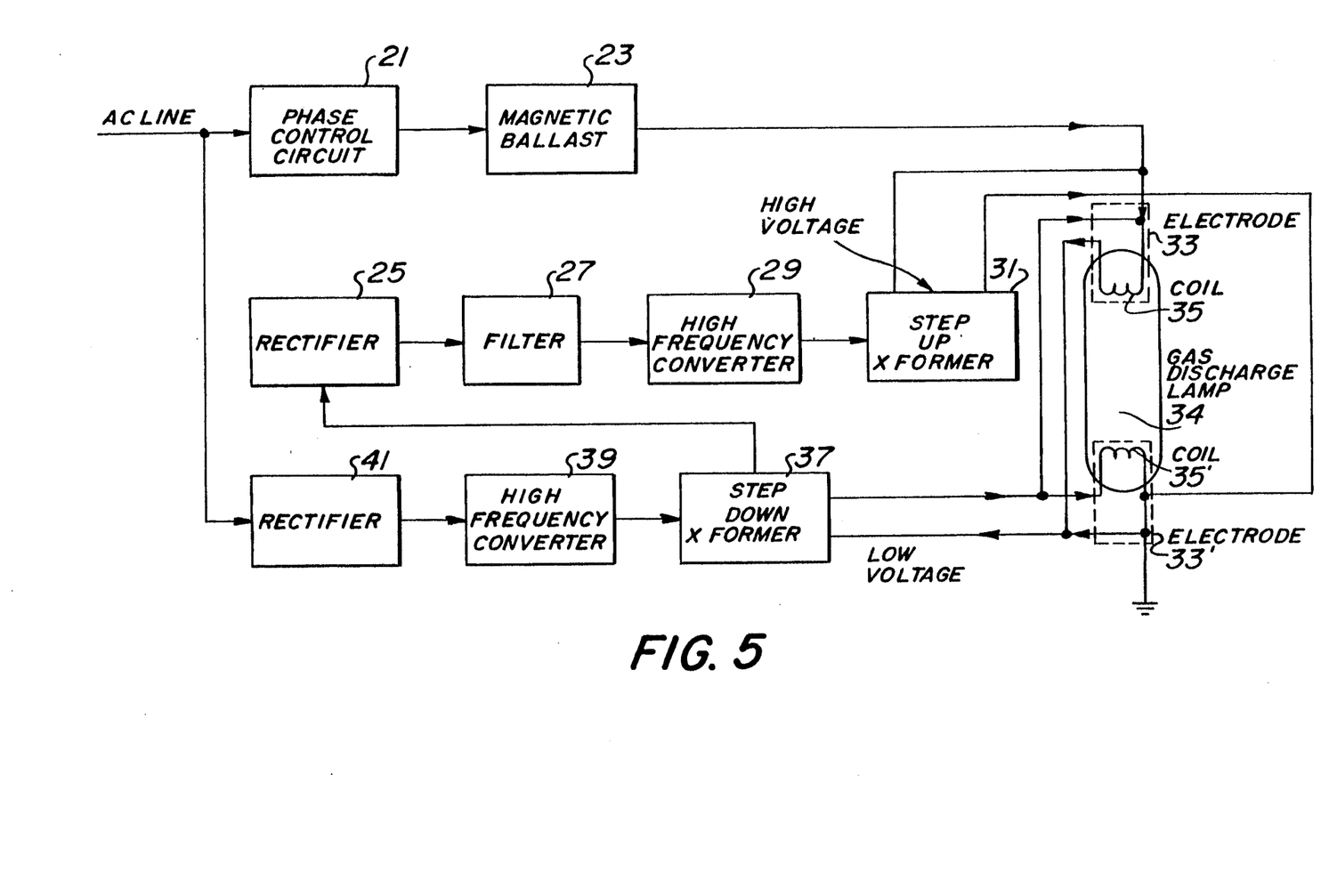
FIG. 5 is a block diagram of one embodiment of a gas discharge lamp dimming system of the present invention.

FIG. 5 is a block diagram of a preferred embodiment of the present invention. Phase control circuit 21 receives line voltage and applies a phase controlled waveform to ballast 23. Ballast 23 provides a phase controlled current flow between electrodes 33 and 33' of gas discharge lamp 34. Alternatively, a variable autotransformer can be used in place of phase control circuit 21 and ballast 23 to provide variable current flow between electrodes 33 and 33' of gas discharge lamp 34.

Ac voltage is rectified by rectifier 41 and frequency-converted by high-frequency converter 39, which may comprise a regenerative base-drive transformer and an oscillating circuit. The high-frequency voltage is stepped-down by step-down transformer 37, which supplies low voltage to electrode coils 35 and 35', and to high-frequency converter 29. Voltage across each electrode coil 35 and 35' is preferably at a frequency of about 30 kHz to 100 kHz, which allows step-down transformer 37 to be relatively small. Alternatively, this voltage may be line frequency or dc.

Rectifier 25 rectifies high-frequency low voltage from step-down transformer 37 and supplies it to filter 27, which smoothes it out. The dc voltage is then converted to high-frequency ac (typically 25 kHz) by high-frequency converter 29 and is provided to step-up transformer 31, which steps up the voltage by a factor of approximately fifteen and applies it between electrodes 33 and 33' for striking and sustaining an electric discharge in lamp 34.

Figure 6:
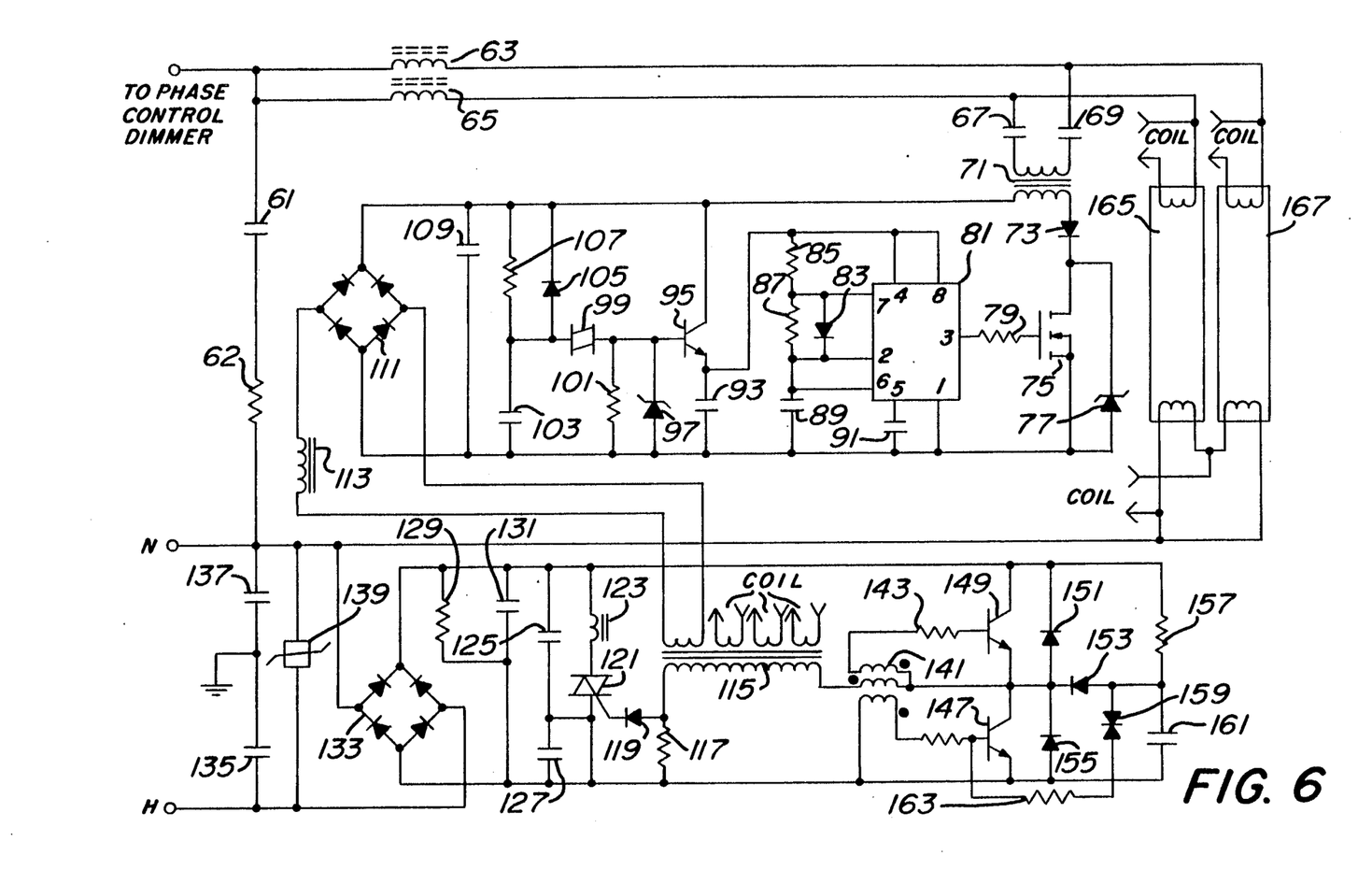
FIG. 6 is a circuit schematic of the dimming system of FIG. 5.

FIG. 6 is a circuit schematic which describes in more detail the preferred embodiment of FIG. 5. Ac supply voltage is placed across full wave bridge rectifier 133. The rectified output of bridge 133 is filtered by main filter capacitor 131 and smoothed dc is placed across voltage dividing capacitors 125 and 127. Resistor 129 provides a shunt to bleed current from filter capacitor 131 to ensure that it completely discharges when power is shut off. Capacitors 125 and 127 provide a reference voltage to which the primary of high-frequency step-down transformer 115 is referenced.

Transistors 147 and 149 are series connected, with the emitter of 149 connected to the collector of 147, and the filtered dc voltage across filter capacitor 131 appears across the series combination. Given base drive, transistor 149 allows capacitor 125 to discharge through the primary of regenerative base-drive transformer 141 and step down transformer 115. This current induces voltage on the secondary windings in such a polarity as to provide base drive to transistor 149 and remove base drive from transistor 147. Once the current through the primary of base-drive transformer 141 consists primarily of magnetizing current, the induced voltage on the secondary windings goes to zero. This causes base drive to be removed from transistor 149, turning it off and stopping current flow through the primary of base-drive transformer 141 and step down transformer 115. As the current through the primary of base-drive transformer 141 drops, the magnetic field in the core begins to collapse, inducing a voltage on the two secondaries in a reversed polarity so as to provide base drive to transistor 147 and to remove base drive from transistor 149. This allows capacitor 127 to discharge through the primary of base-drive transformer 141 and transformer 115 in an opposite direction, thus creating a high-frequency ac driving voltage on the primary of transformer 115. Secondary windings of transformer 115 supply power for heating the lamp electrodes and supply voltage to full-wave bridge rectifier 111. Resistors 143 and 145 limit base drive current to transistors 149 and 147 respectively. Diodes 151 and 155 provide a commutation path for alternating current flow in the primary of step-down transformer 115.

Inductor 123, triac 121, diode 119, and resistor 117 comprise an optional overload protection circuit. Current-sensing resistor 117 is in series with the primary of step down transformer 115, placing voltage across diode 119 and the gate-to-anode junction of triac 121. Alternatively, current-sensing resistor 117 could be replaced with a current transformer or an optically coupled device (such as an opto-transistor) if isolation is necessary. Triac 121 becomes conductive if the voltage across resistor 117 is greater than the sum of the forward biasing voltage of diode 119 and the gate-to-anode voltage of triac 121 (usually 1 volt), indicating excessive current through the primary winding of transformer 115. If triac 121 becomes conductive, voltage dividing capacitor 125 discharges, removing current from the primary of base-drive transformer 141 and disabling the circuit. Alternatively, the circuit can be disabled with a positive temperature coefficient resistor connected in series with the primary winding of transformer 115. Inductor 123 limits the rate of current rise through triac 121 in order to avoid damaging the triac.

Resistors 157 and 163, diode 153, diac 159, and capacitor 161 comprise an initialization circuit for initializing upon start-up the oscillating circuit comprising transistors 147 and 149. Since transistors 147 and 149 are initially off, capacitor 161 charges up through resistor 157 until it reaches sufficient voltage to break over diac 159. When diac 159 breaks over, capacitor 161 discharges through resistor 163 and the base of transistor 147, turning it on and allowing capacitor 127 to discharge through the primary of base-drive transformer 141 to initiate oscillation. During normal operation, diode 153 prevents capacitor 161 from charging up to the breakover voltage of diac 159 by providing a discharge path through transistor 147, which alternates its conductive state at a high-frequency.

Full wave bridge 111 receives high-frequency ac voltage from step down transformer 115 and rectifies it into a high-frequency modulated dc voltage, which is smoothed by filter capacitor 109. Filtered dc voltage appears across series-connected FET 75 and the primary of step-up transformer 71. Timer 81 provides high-frequency base drive to FET 75 at about a 10% duty cycle, which allows high-frequency dc current to flow through the primary of transformer 71. Stepped-up high-frequency ac voltage induced on the secondary is transmitted through capacitors 67 and 69 and applied between the electrodes of series-connected gas discharge lamps 165 and 167.

Zener diode 77 shunts FET 75 to limit the voltage across it when FET 75 is switched off. Capacitors 67 and 69 prevent line-frequency current from flowing through the secondary winding of transformer 71 and saturating the core. Diode 73 is connected in series with FET 75 and prevents ringing that might otherwise occur between transformer 71 and capacitors 67 and 69.

Inductor 113 limits the power transmitted to bridge 111 and to gas discharge lamps 165 and 167, without dissipating additional power. Inductor 113 drops voltage while it is conducting high-frequency current, but it allows for increased voltage to the bridge 111 during start-up, when the current through the choke is minimal, to aid in striking the lamps. Because the transmitted power is at a high-frequency, inductor 113 may be substantially smaller than a line-frequency inductor of the same impedance.

Timer 81 operates as follows: 12 Vdc is supplied to pin 8 to power the timer. Timing capacitor 89 charges through diode 83 and resistor 85 until it reaches approximately six volts, at which time the voltage across capacitor 89, which appears on pin 6, causes pin 3 to become electrically disconnected and pin 7 to become electrically connected with pin 1 (which is tied to 0 volts). Timing capacitor 89 then discharges through resistor 87 until it reaches approximately 4 volts, at which time the voltage across capacitor 89, which appears on pin 2, causes the timer to connect pin 3 to pin 8 (power) and disconnect pin 7. While capacitor 89 recharges, pin 3 supplies base drive to FET 75 through current limiting resistor 79 until the voltage on timing capacitor 89 again reaches six volts. By choosing the values of resistors 85 and 87 and capacitor 89, one fixes the frequency and duty cycle of the timer output pin 3 and, thus, the frequency and power of the high-frequency current delivered to the lamps. Pin 5 is connected to zero volts through capacitor 91.

Transistor 95, Zener diode 97 and energy storage capacitor 93 provide regulated voltage to timer 81. In normal operation, silicon bilateral switch (SBS) 99 is conductive and allows current to flow through series-connected resistor 107 and Zener diode 97, placing the reverse biasing voltage of Zener diode 97 across the base/emitter junction of transistor 95 and capacitor 93. If the voltage across capacitor 93 plus the base/emitter voltage drop of transistor 95 is less than the reverse biasing voltage of Zener diode 97, current flows through the base/emitter junction, causing the transistor to conduct and allowing capacitor 93 to charge. The characteristics of the circuit are such that the voltage on capacitor 93 is maintained at a relatively constant value and is approximately equal to the reverse biasing voltage of Zener diode 97 less the base/emitter voltage drop of transistor 95.

SBS 99, resistor 107, and capacitor 103 comprise a start-up delay circuit to delay applying power to timer 81 (and thus to FET 75 and the gas discharge lamps) for a predetermined time, to allow the lamp electrodes to heat up before striking an arc. Upon initial lamp start-up, capacitor 103 begins charging through resistor 107 until the voltage is sufficient to cause SBS 99 to break over. Once it breaks over, SBS 99 allows current to flow through Zener diode 97 and to the voltage regulation circuit which provides power to timer 81. If power is removed, capacitor 103 quickly discharges through diode 105 to allow for rapid resetting of the start-up delay circuit in the event that power is immediately reapplied. Resistor 101 provides a path for leakage current, which leaks through SBS 99 and the base/collector junction of transistor 95, in order to prevent premature conduction of transistor 95 during start-up. Alternatively, a digital timing circuit or a positive temperature coefficient resistor could be used to delay application of power to lamps 165 and 167.

Resistor 62 and capacitor 61 comprise a low pass filter to limit the high-frequency voltage appearing on the dimmed hot line. Optional capacitors 135 and 137 limit high-frequency voltages on the hot and neutral lines respectively. Metal Oxide Varistor (MOV) 139 is an optional high voltage protection device and operates to limit the hot-to-neutral voltage to a value below the rated voltages of the elements comprising the circuit.

Inductors 63 and 65 are magnetic ballasts which limit the line-frequency phase controlled current flowing through each of the parallel-connected gas discharge lamps 165 and 167 respectively. Inductors 63 and 65 also function to substantially block high-frequency voltage induced on the secondary of transformer 71 from appearing on the dimmed hot line.

Figure 7:
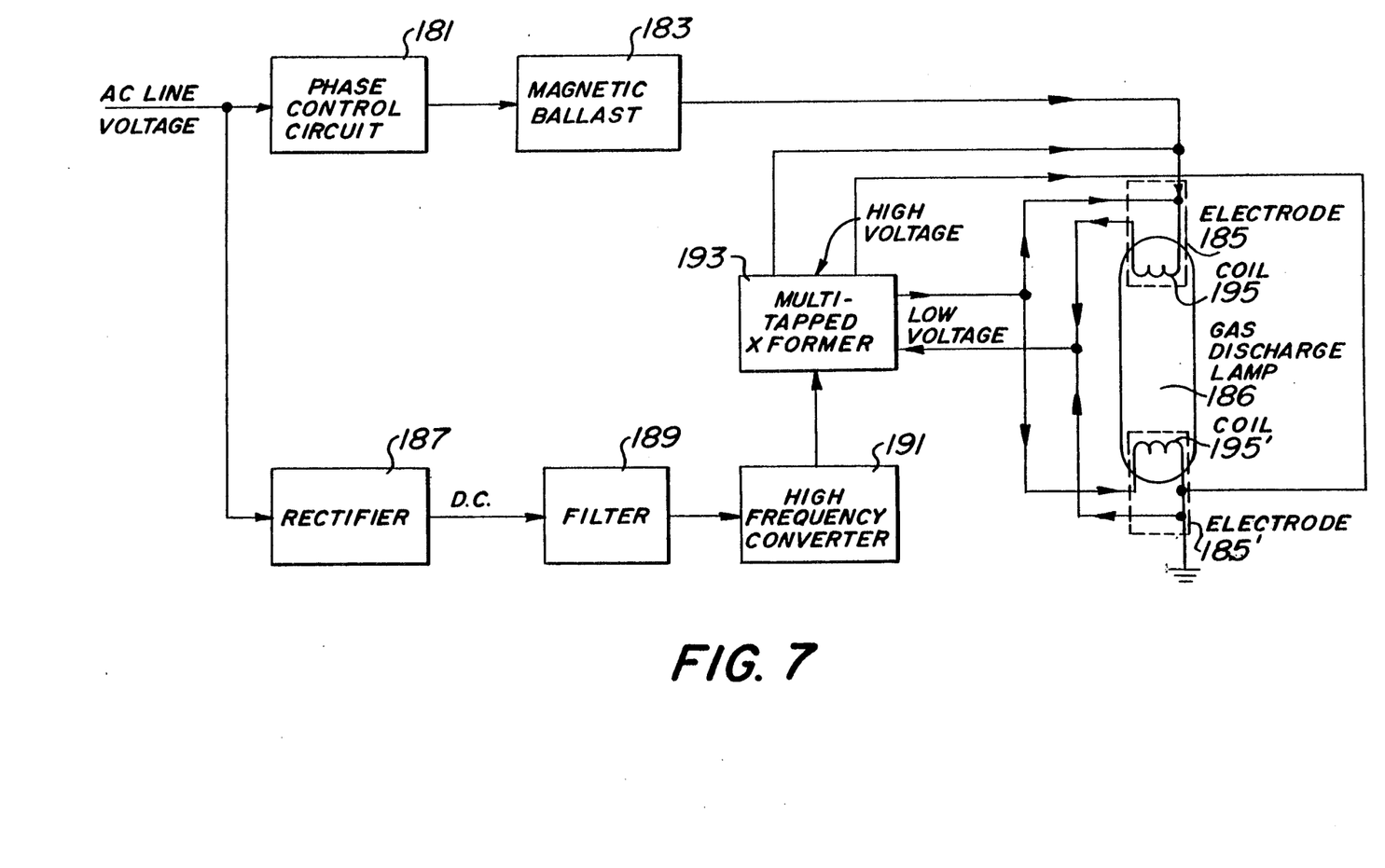
FIG. 7 is a block diagram of another embodiment of a gas discharge lamp dimming system of the present invention.

FIG. 7 is a block diagram of another embodiment of a gas discharge lamp dimmer of the present invention for use with standard magnetic ballasts. A single high-frequency transformer provides low-level current flow from electrode 185 to electrode 185' and provides low-voltage across each electrode coil 195 and 195' of gas discharge lamp 186. Phase control circuit 181 receives 50 or 60 Hz line voltage and applies a phase control waveform to ballast 183. The phase delay determines the RMS voltage applied to ballast 183. Ballast 183 provides current from electrode 185 to electrode 185'. Alternatively, a variable auto-transformer may be used in place of phase control circuit 181 to provide an adjustable current from electrode 185 to electrode 185'.

Ac line voltage is rectified by rectifier 187 and smoothed by filter 189. The resulting dc voltage is then converted to high-frequency ac voltage by high-frequency converter 191, which may comprise a regenerative base-drive transformer and an oscillating circuit, or a digital timer and a FET, etc. The period of the high-frequency voltage is preferably much smaller than the recombination time of the ionized gas in the lamp 186. The high-frequency voltage is provided to transformer 193, which has at least two secondary windings. One winding steps up the high-frequency voltage and provides low-level current flow from electrode 185 to electrode 185' in order to sustain an electric discharge during phase delays of the phase control circuit 181. An additional winding steps down the high-frequency voltage and applies it across each electrode coil 195 and 195' to heat the electrodes.

Figure 8:
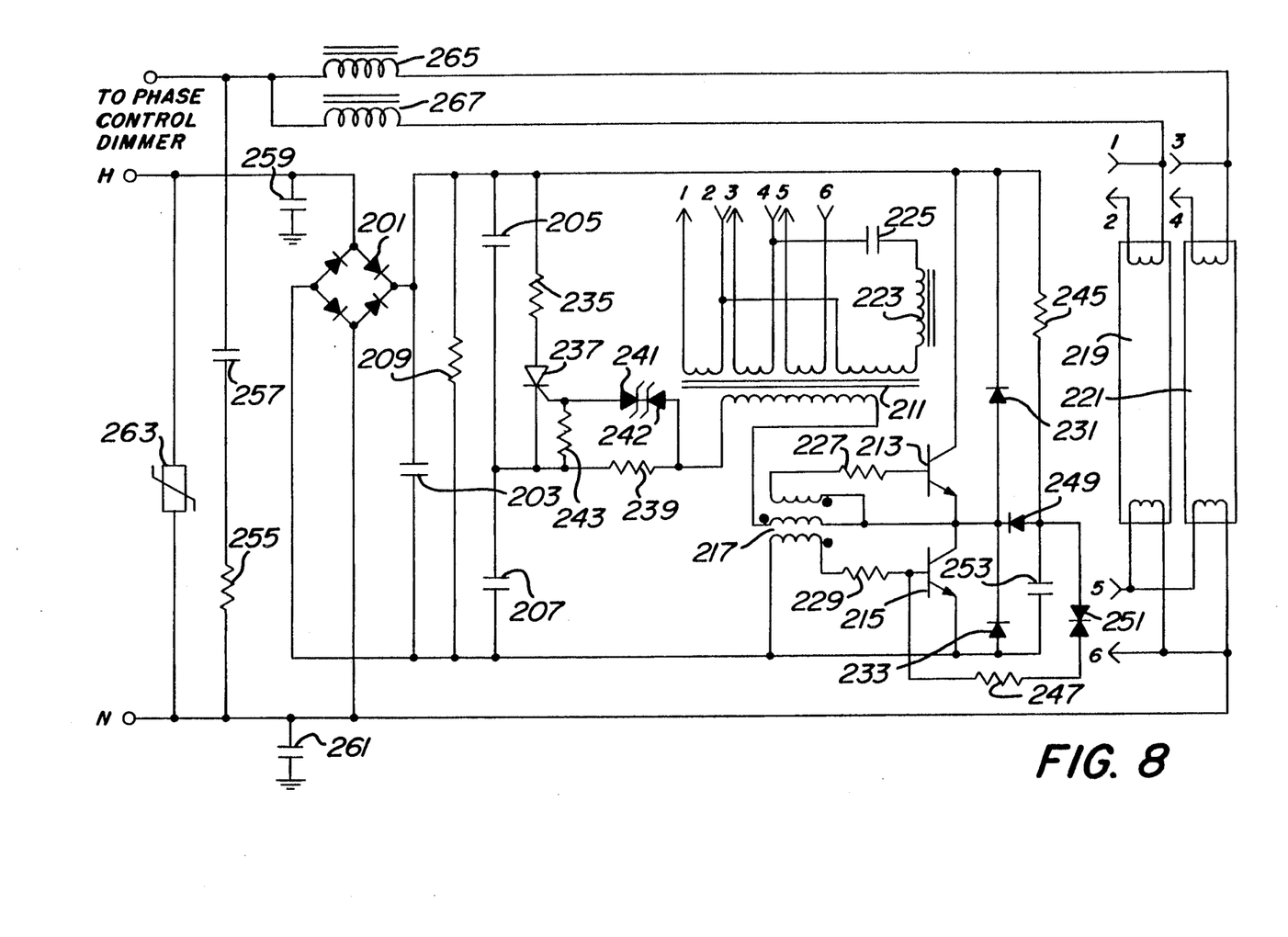
FIG. 8 is a circuit schematic of the dimming system of FIG. 7.

FIG. 8 is a circuit schematic of the dimming system of FIG. 7. Ac supply voltage is placed across full wave bridge rectifier 201. The rectified output of bridge 201 is filtered by main filter capacitor 203 and smoothed dc is placed across series-connected voltage dividing capacitors 205 and 207. Resistor 209 provides a shunt to bleed charge from filter capacitor 203 to ensure that it completely discharges when power is shut off. Capacitors 205 and 207 provide a reference voltage to which the primary of high-frequency transformer 211 is referenced.

Transistors 213 and 215 are series connected with the emitter of 213 connected to the collector of 215. The filtered dc voltage across filter capacitor 203 appears across the series combination. Given base drive, transistor 213 allows capacitor 205 to discharge through the primary of regenerative base-drive transformer 217 and high-frequency transformer 211. This current induces voltage on the secondary windings in such a polarity as to provide base drive to transistor 213 and remove base drive from transistor 215. Once the current through the primary of base-drive transformer 217 consists primarily of magnetizing current, the induced voltage on the secondary winding goes to zero. This causes base drive to be removed from transistor 213, turning it off and stopping current flow through the primary of base-drive transformer 217 and high-frequency transformer 211. As the current through the primary of base-drive transformer 217 drops, the magnetic field in the core begins to collapse, inducing a voltage on the two secondaries in a reversed polarity so as to provide base drive to transistor 215 and to remove base drive from transistor 213. This allows capacitor 207 to discharge through the primary of base-drive transformer 217 and high-frequency transformer 211 in an opposite direction, thus creating a high-frequency ac driving voltage on the primary of transformer 211. Secondary windings of transformer 211 supply stepped-down voltage for heating the electrodes and stepped-up voltage for striking series-connected lamps 219 and 221. During steady-state operation, inductor 223 limits high-frequency current to lamps 219 and 221. During lamp start-up, inductor 223 allows high voltage to be applied across the lamps to strike an arc. Capacitor 225 blocks line-frequency voltage variations from saturating high-frequency transformer 211. Resistors 227 and 229 limit base-drive current to transistors 213 and 215 respectively. Diodes 231 and 233 provide a commutation path for alternating current flow in the primary of high-frequency transformer 211.

Resistor 235, SCR 237, current-sensing resistor 239, Zener diodes 241 and 242, and resistor 243 comprise an optional overload protection circuit. Current-sensing resistor 239 is in series with the primary of high-frequency transformer 211, placing a voltage across Zener diodes 241 and 242, and the gate-to-anode junction of SCR 237. SCR 237 becomes conductive if the voltage across resistor 239 is greater than the sum of the reverse biasing voltage of Zener diode 241, forward biasing voltage of Zener diode 242 and the gate-to-anode voltage of SCR 237 (approximately 2-3 volts), indicating excessive current through the primary of high-frequency transformer 211. If SCR 237 becomes conductive, voltage dividing capacitor 205 discharges, shorting out the primary of transformer 211 and disabling the circuit. Resistor 243 ties the gate of SCR 237 to a known voltage in order to avoid misfiring due to spurious noise.

Resistors 245 and 247, diode 249, diac 251, and capacitor 253 comprise a circuit for initializing upon start-up the oscillating circuit including transistors 213 and 215. Since transistors 213 and 215 are initially off, capacitor 253 charges up through resistor 245 until it reaches sufficient voltage to break over diac 251. When diac 251 breaks over, capacitor 253 discharges through resistor 247 and the base of transistor 215, turning it on and allowing capacitor 207 to discharge through the primary of base-drive transformer 217 to initiate oscillation. During normal operation, diode 249 prevents capacitor 253 from charging up to the breakover voltage of diac 251 by providing a discharge path through transistor 215 which alternates its conductive state at a high-frequency during normal operation.

Resistor 255 and capacitor 257 comprise a low pass filter to limit the high-frequency voltage appearing on the dimmed hot line. Optional capacitors 259 and 261 limit high-frequency voltages on the hot and neutral lines respectively. MOV 263 is an optional high voltage protection device and operates to limit the hot-to-neutral voltage to a value below the rated voltages of the elements comprising the circuit.

Inductors 265 and 267 are ballasts which limit the line-frequency phase controlled current flowing through each of the parallel connected gas discharge lamps 219 and 221 respectively. Inductors 265 and 267 also function to substantially block high-frequency stepped-up voltage induced on the secondary of transformer 211 from appearing on the dimmed hot line.

Figure 9:
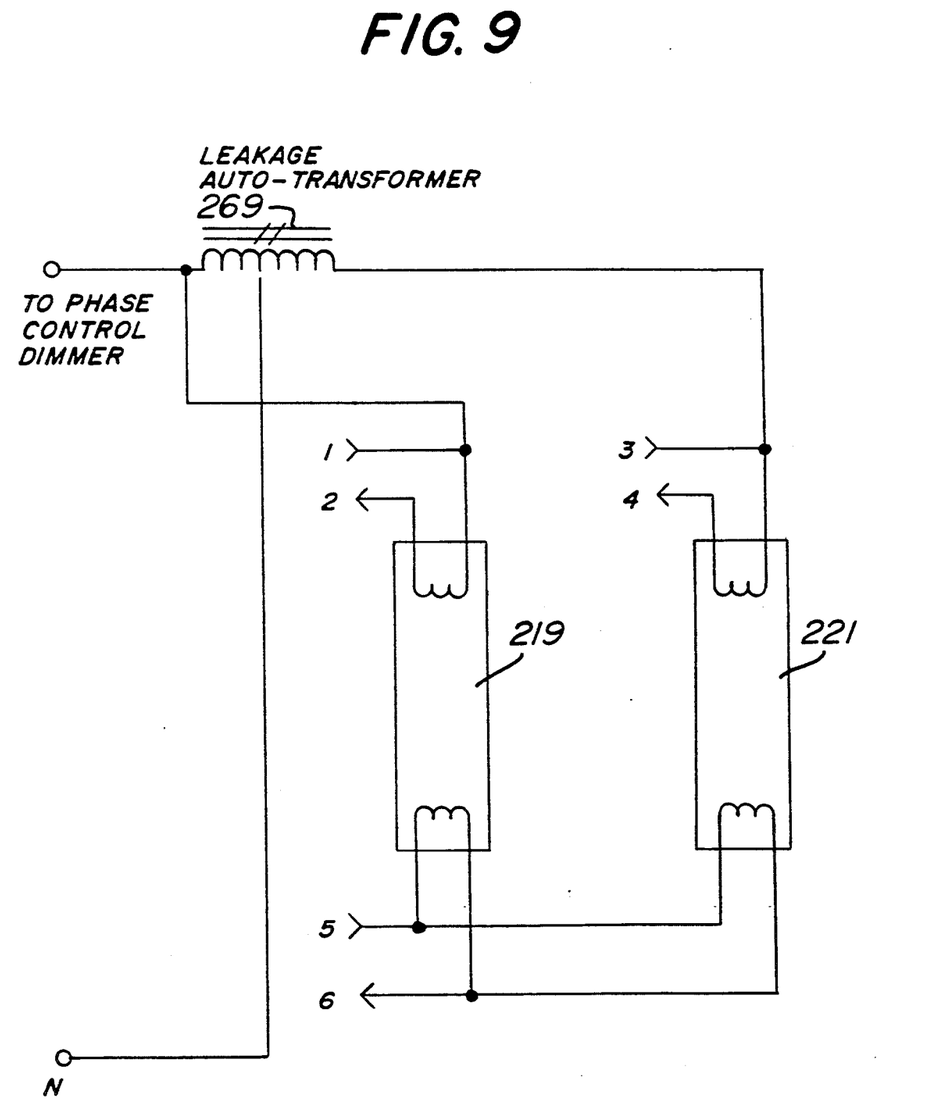
FIG. 9 depicts a variation on the circuit of FIG. 8.

FIG. 9 depicts a variation on the circuit of FIG. 8 in which inductors 265 and 263 are replaced with a leakage auto-transformer 269 which operates lamps 219 and 221 in series. Preferably, leakage auto-transformer 269 steps up line voltage and places it across the series-connected lamps. This circuit has the unexpected advantage of a desirable lamp start-up sequence. Providing a desirable lamp start-up sequence generally involves allowing the electrodes to heat up for about 200-300 ms before an arc is struck, as striking an arc before the electrodes are hot reduces lamp life. The reason for this unexpected result is not clear; however, an attempt to understand it requires an analysis of the impedance characteristics of gas discharge lamps, as follows.

Figure 10:
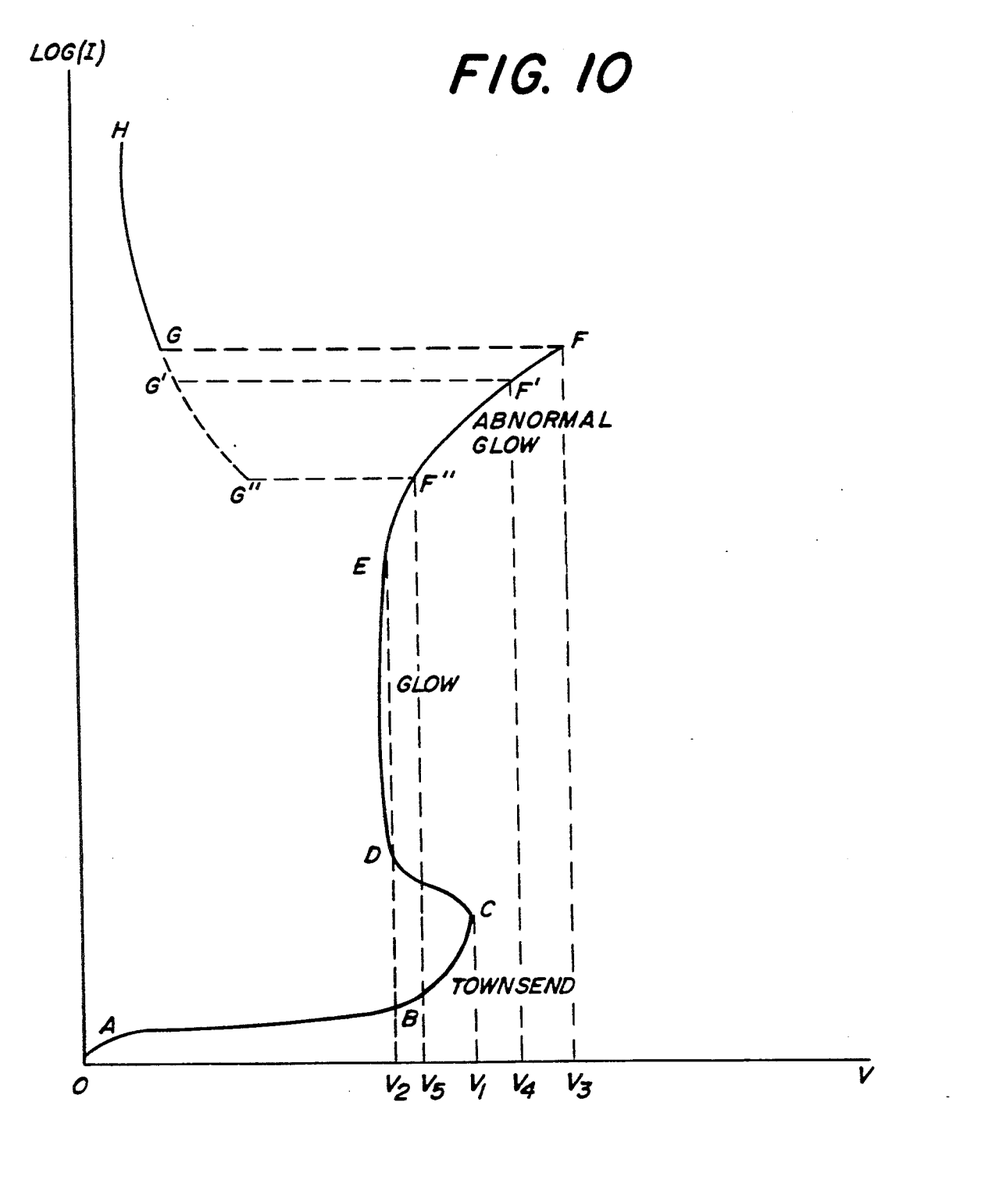
FIG. 10 is a graph illustrating the impedance characteristics of a typical gas discharge lamp.

FIG. 10 is a graph of the impedance characteristics of a typical gas discharge lamp showing three types of gaseous discharges—Townsend, glow, and arc (in order of increasing current). Townsend discharge is attributable to trace amount of ions and electrons present in all gases as a result of external environmental radiation. As the voltage across the lamp is increased from zero, the current (I) increases as the few electrons and positive ions in the gas tube are drawn to the electrodes. At A, these charges are being drawn away as quickly as they are being created, and there is negligible increase in current as the tube voltage is further increased from A to B. The currents involved here are very small, of the order of nanoamperes, or less.

After B, a new phenomenon begins. The voltage is now large enough so that the electrons in the gas acquire sufficient kinetic energy to ionize additional gas atoms. Current increases rapidly from B to C.

At point C, conditions are right for the discharge to become self-sustaining. For this to occur, a new phenomenon, secondary emission, must begin. The positive ions created by the ionization process are accelerating toward the cathode due to the electric field. As the field strength increases (as V increases), some of these ions will have sufficient kinetic energy to dislodge electrons from the cathode, upon impact. The condition for the discharge to become self-sustaining is that the electric field must be large enough so that, for each primary electron, enough positive ions are created so that one of these has sufficient energy to dislodge one secondary electron from the cathode. Then the primary electron is no longer needed and the discharge sustains itself. We define the voltage at which the transition from a Townsend to a glow discharge takes place as the Townsend-glow-transition voltage.

As the voltage across the lamp is increased, the discharge current increases to point D in FIG. 10. During this movement, the current increases and the voltage across the tube decreases and then becomes constant. The discharge is now defined as a glow discharge and is self-sustaining. The voltage across the lamp is typically 100 to 300 V, slightly less than the breakdown voltage of the gas, and the current is in the milliampere range. From D to E, the voltage is essentially independent of current, with the latter being limited by an external ballast. We define the voltage necessary to sustain a glow discharge (in the region between D and E) as the glow voltage. Large numbers of positive ions and a high electric field must be present to produce the required secondary electrons. Because they are heavier, the positive ions remain in the region much longer than do the electrons and the result is a net positive charge (space charge) near the cathode. Nearly all of the electric field lines originating at the cathode terminate on these positive ions. Thus, most of the voltage drop across the tube appears near the cathode and the current at the cathode is predominantly positive ion current.

As the glow current increases from D, the glow discharge covers an increasing portion of the cathode surface, keeping current density constant until, at E, all the surface is covered. As the voltage increases further, the current density increases and the glow discharge begins to concentrate at a single spot, which increases in temperature. Steady-state operation of the lamp between points E and F is undesirable because the high electric field near the cathode causes it to be severely bombarded with high speed positive ions. At F, the cathode "hot spot" becomes hot enough (about 3300K. for tungsten) to emit thermionically, and the glow becomes an arc. We define the voltage at which the transition from a glow to an arc takes place as the glow-arc-transition voltage. Point F is not a stable operating point and a rapid transition occurs from F to G. The arc region from G to H has a negative resistance characteristic (voltage decreases as current increases); thus the current must be limited by an external element, such as an inductive ballast. However, even though the current is limited by a ballast, the dramatic reduction in lamp impedance causes the current through the lamp to increase very rapidly, by an order of magnitude or more. This can create stresses in the lamp, such as thermal stress on the electrodes, that far exceed stresses encountered in steady-state operation and can reduce lamp life considerably.

In the arc discharge region, the current is relatively high (0.1-10 A) and the voltage drop near the cathode is low, of the order of the ionization potential of the gas (10 to 20 V). But this voltage drop is adequate, because it is no longer necessary to accelerate large numbers of positive ions to the cathode to produce the required number of secondary electrons. Rather, all that is needed is to have sufficient bombardment to keep the hot spot emitting thermionically.

When the cathode is heated by voltage applied across a tungsten coil, for example, the transition from a glow current to an arc current, as indicated by points F' and G', occurs at a lower voltage $V_4$. This is desirable during lamp start-up because the reduced glow-arc-transition voltage $V_4$ and the smaller change in lamp impedance from F' to G' results in reduced stresses in the lamp during the glow-arc-transition. It is desirable to reduce lamp stress and, thus, extend lamp life. Prior art systems, however, are not able to reduce the glow-arc-transition voltage below the Townsend-glow-transition voltage $V_1$ since a voltage higher than $V_1$ is needed in order to transcend the Townsend discharge region from A to C.

The present invention, upon start-up, initially provides a current limited, high-frequency voltage between the electrodes to strike a low-level glow current in the lamp between points D and E. A high-frequency voltage is also provided across the electrode coils to heat the electrodes. Simultaneously a line-frequency voltage $V_5$, which is less than the Townsend-glow-transition voltage $V_1$, is provided between the electrodes and sustains a glow discharge through the lamp. As the electrodes heat up, the glow-arc-transition point moves F towards F''. When it reaches F'' (approximately 200-300 ms), the line-frequency voltage $V_5$ is sufficient to initiate thermionic emission at the cathode and strike an arc in the lamp. The smaller lamp impedance transition from F'' to G'' results in reduced lamp stresses and extended lamp life. Thus, lamp life is increased as the glow-arc-transition voltage $V_5$ approaches the glow voltage $V_2$.

Figure 11:
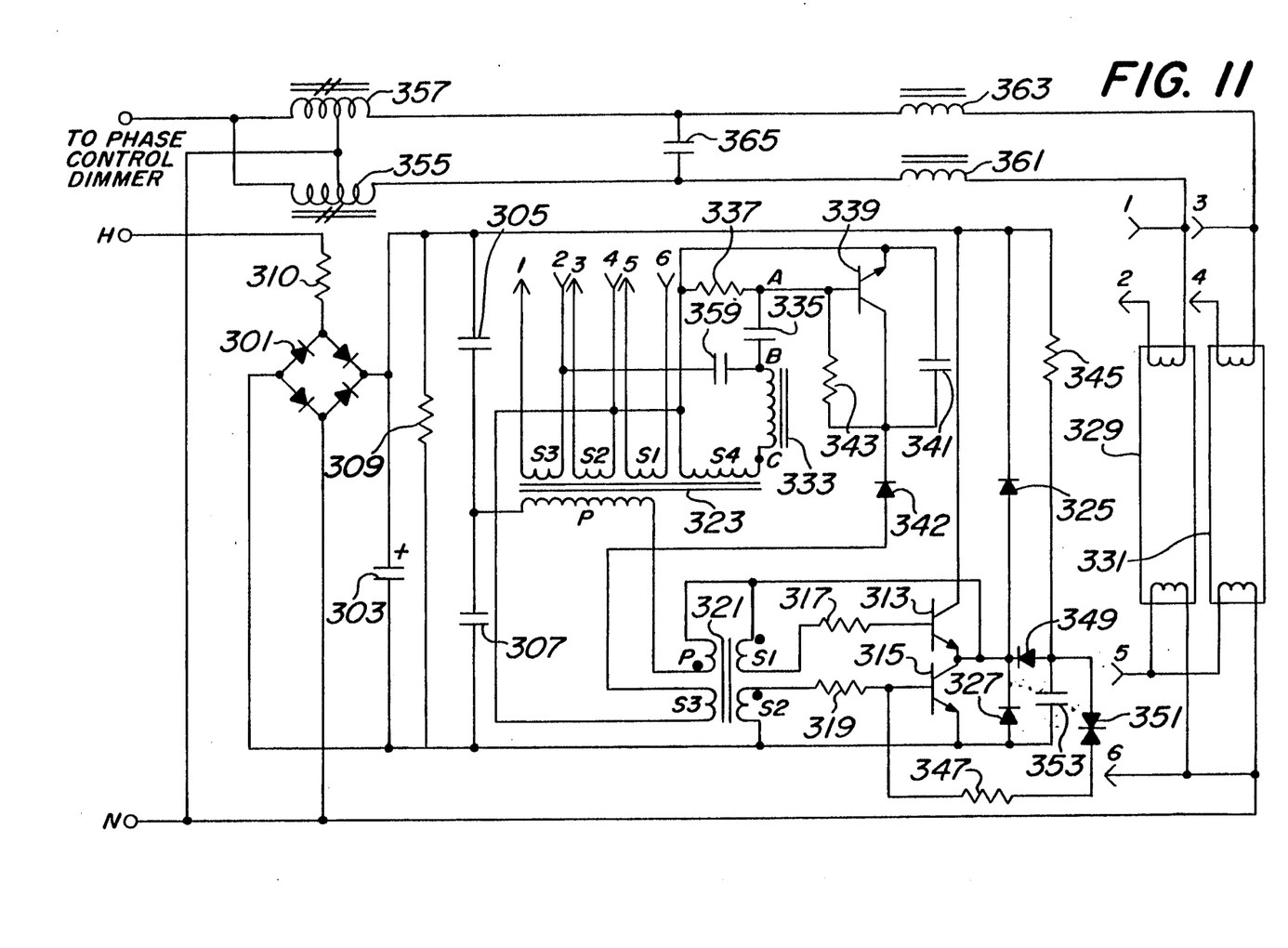
FIG. 11 is a circuit schematic of a compact fluorescent lamp dimming system of the present invention.

FIG. 11 is a circuit schematic of a compact fluorescent lamp dimming system of the present invention. The dimming circuit operates in a manner similar to the circuits shown in FIGS. 6 and 8, except that the high-frequency voltage is generated by a resonant LC circuit driven by a high-frequency oscillating circuit. The resonant circuit is capable of producing peak striking voltages in excess of 1000 V. This dimming circuit is ideally suited for operating compact fluorescent lamps and other types of gas discharge lamps that require high striking voltages. The circuit operates as follows:

Full wave bridge 301, capacitors 303, 305 and 307, and resistor 309 comprise a dc power supply circuit and correspond to elements 201-209, respectively, in FIG. 8. Resistor 310 is connected to the ac side of full wave bridge 301 to limit high inrush currents and to protect the dimming circuit from high currents that may result if its output is inadvertently short circuited.

Transistors 313 and 315, resistors 317 and 319, and regenerative base-drive transformer 321 form a high-frequency oscillating circuit. Transistors 313 and 315 are connected in series, the emitter of 313 connected to the collector of 315. The voltage across dividing capacitors 305 and 307 is placed across transistors 313 and 315, respectively. Given base drive, transistor 313 allows capacitor 305 to discharge through the primary windings P of regenerative base-drive transformer 321 and high-frequency transformer 323. This current induces voltage on secondary windings S1 and S2 of transformer 321 of such a polarity as to provide base drive to transistor 313 and remove base drive from transistor 315.

Once the current through primary winding P of transformer 321 consists mainly of magnetizing current, the induced voltage on secondary winding S1 drops off. This causes base drive to be removed from transistor 313, turning it off and decreasing current flow through the primary windings P of transformers 321 and 323. The ensuing collapse of the magnetic field in the core of transformer 321 induces a voltage on secondary windings S1 and S2 of such a polarity as to provide base drive to transistor 315 and remove drive from transistor 313, reversing the direction of current flow through primary winding P of transformer 321.

This cycle is self regenerative and results in a high-frequency ac driving voltage impressed onto the secondary windings S1, S2, S3, and S4 of transformer 323. The driving frequency is preferably between 20 kHz and 50 kHz. Frequencies below 20 kHz are in the human audible range and are therefore undesirable. High frequencies (above 50 kHz) are undesirable because they tend to cause high thermal dissipation in the switching transistors 313 and 315 and they lower the capacitive impedance of the fixture wires to ground. In the circuit depicted in FIG. 11, a driving frequency of about 40 kHz is preferred.

The desired driving frequency can be obtained by appropriately selecting resistors 317 and 319 and the number of turns on primary winding P and secondary windings S1 and S2 of transformer 321. Resistors 317 and 319 also serve to minimize asymmetries that can be caused by variations in the base/emitter voltage drop of transistors 313 and 315. Diodes 325 and 327 provide a commutation path for current flowing through transistors 315 and 313, respectively. Alternatively, transistors 313 and 315 could be replaced with FETS, MOSFETS, or other types of switching devices; however, bipolar transistors, as shown, are preferred because of their low forward voltage drop and their relatively low cost.

The oscillating circuit may be replaced with a less-expensive semiconductor dc frequency converter, which converts a non-pulsating dc voltage into a pulsating high-frequency dc voltage. An inverting type of oscillating circuit, which converts dc to ac, is preferred, however, since it provides reduced peak magnetic flux in the core of transformers 321 and 323 for the same amount of transformed energy.

Secondary windings S1, S2, and S3 of transformer 323 provide stepped-down high-frequency voltage across the electrode coils of lamps 329 and 331 to heat the electrodes. Secondary winding S4 provides high-frequency driving voltage to the resonant LC circuit formed by inductor 333 and capacitor 335.

The resonant circuit has input terminals (A and C) formed across inductor 333 and capacitor 335 in series and output terminals (A and B) formed across capacitor 335. Lamps 329 and 331 are connected in series between the output terminals, loading the resonant circuit in parallel. The peak response frequency of the resonant circuit is preferably near the driving frequency of the high-frequency oscillating circuit in order to achieve a resonant response. In this particular circuit, the impedance of the resonant circuit is reflected back through transformer 323 to the primary of transformer 321 and tends to impel the oscillating circuit to operate at the peak response frequency of the resonant circuit, thus providing maximum resonant response. In this specification and the appended claims, a resonant circuit is understood to have a single fundamental mode of resonance. The term "peak response frequency" refers to the frequency at which this fundamental resonance is maximized.

The voltage across the output terminals is preferably between 100 V and 1000 V RMS, in order to strike and maintain an electric discharge in the lamps, and is determined by the damping of the resonant circuit. In this case, the amount of damping is determined primarily by the impedance of the lamps, which load the resonant circuit in parallel. This stabilizes the operation of the gas discharge lamps, which are inherently unstable due to a negative resistance characteristic of the electric discharge. In particular, as the lamps' impedance increases, damping of the resonant circuit decreases, allowing increased resonant response at the driving frequency and a higher voltage across the output terminals. Conversely, as the impedance of the lamps decreases, damping of the resonant circuit increases, forcing the resonant response and the voltage across the output terminals to decrease. Before the lamps are struck, their impedance is very high and voltage across the output terminals of the resonant circuit quickly ramps up to the striking voltage of the lamps. Once the lamps are struck, their impedance drops sharply and the voltage across the output terminals decreases accordingly, such that power flow to the lamps remains relatively stable.

An optional voltage overload circuit is provided which limits the maximum response of the resonant circuit when the lamps do not strike or when one of the lamps is disconnected from the circuit. The overload circuit consists of sensing resistor 337, transistor 339, capacitor 341, and diode 342. When the instantaneous voltage across sensing resistor 337 exceeds the base/emitter voltage drop of transistor 339 ($\sim 0.7$ V), transistor 339 turns on, drawing current from capacitor 341. This places an additional load on regenerative base-drive transformer 321 through secondary winding S3 and forces the driving frequency of the oscillating circuit to a lower frequency, further from the peak response frequency of the resonant circuit, thereby reducing its resonant response. The feedback characteristics of the overload circuit are chosen so that the output voltage of the resonant circuit remains clamped below a predetermined maximum peak voltage ($\sim 1000$ V).

To further increase the stability of the resonant circuit, optional resistor 343 is connected between the collector and gate of transistor 339 to allow current to flow through transistor 339 and secondary winding S3 of transformer 321. During normal operation, this further loads transformer 321 to decrease the driving frequency of the oscillating circuit to about 37 kHz, slightly detuning it from the peak response frequency of the resonant circuit ($\sim 40$ kHz). The added stability that results from the detuning enables lamps 329 and 331 to operate over a wide range of power levels ($\sim 5$–$100\%$) without any noticeable flicker. Alternatively, stability can be achieved by adding more damping to the resonant circuit; however, this reduces the efficiency of the circuit and generates unwanted heat.

Resistors 345 and 347, diode 349, diac 351, and capacitor 353 comprise a circuit that initializes the oscillating circuit upon lamp start-up. The elements operate identically to corresponding elements 245–253 in FIG. 8.

Line frequency current is provided to lamps 329 and 331 by leakage auto transformers 355 and 357, respectively, which are connected to a switch-controlled power source (phase control dimmer). Although shown as leakage auto-transformers, which are preferred, elements 355 and 357 could be any type of ballast having a capacitive component of impedance. Power to each lamp is substantially determined by the RMS value of current provided by the corresponding leakage auto-transformer. Capacitor 359 blocks line frequency voltage but allows the high-frequency voltage produced by the resonant circuit to be applied across lamps 329 and 331 to keep them struck.

Parasitic capacitance in leakage auto-transformers 355 and 357 can partially short out lamps 329 and 331 with respect to the high-frequency voltage provided by the resonant circuit. This can significantly degrade the response of the resonant circuit causing insufficient striking voltage to the lamps and can also interfere with the switch-controlled powere source. The parasitic capacitance of a leakage auto-transformer is typically in the range from 200 to 800 pF. This capacitance is generally not a problem for conventional (60 Hz) control circuits, since its impedance at 60 Hz is very large, but at higher frequencies ($>20$ Hz) its impedance drops significantly. Although a leakage auto-transformer having greatly reduced parasitic capacitance could be specially designed for use with the dimming circuit of the present invention, it is highly desirable that the dimming circuit be compatible with a wide variety of commercially available leakage auto-transformers and switch-controlled power sources.

Accordingly, an important aspect of the present invention is the provision of isolation inductors 361 and 363 in series with corresponding leakage auto-transformers 355 and 357 to block the low impedance, high-frequency path through the leakage auto-transformers. The inductors are preferably selected to provide adequate isolation for a wide range of parasitic capacitance values. The preferred value of each inductor 361 and 363 was experimentally determined to be between about 20 mH and 100 mH.

Optional capacitor 365 provides between inductors 361 and 363 a low impedance path relative to the impedance path through the parasitic capacitance of leakage auto-transformers 355 and 357. This further isolates the leakage auto-transformers and, particularly, the switch-controlled power source connected thereto, from the high frequency voltage produced by the resonant circuit. The value of capacitor 365 is preferably selected to be larger than the greatest amount of parasitic capacitance among commercially available leakage auto-transformers to allow compatability with the widest variety of auto-transformers and switch-controlled power sources.

Although the dimming circuit of FIG. 11 is particularly suited for operating compact fluorescent lamps, it can also be used to operate any other type of gas discharge lamp. Since certain changes may be made in the above circuit without departing from the scope of the invention herein involved, it is intended that all matter contained in the above description or shown in the accompanying drawings shall be interpreted in an illustrative and not a limiting sense.

We claim:

1. A control system for providing electrical power from a source to a gas discharge lamp, comprising:
    a) a resonant circuit having input and output terminals, said lamp being connectable across said output terminals to provide parallel loading of said resonant circuit; and
    b) driving means to provide a symmetrical high-frequency ac driving voltage across said input terminals to achieve a resonant response in said resonant circuit and produce a voltage across said output terminals sufficient to strike and maintain an electric discharge in said lamp, said driving means comprising an oscillating circuit including a switching transistor controlled by a regenerative base-drive transformer wherein said driving means after striking said electric discharge drives said resonant circuit at a frequency away from a peak response frequency of said resonant circuit.

2. The control system of claim 1 wherein said resonant circuit comprises a capacitor and an inductor connected in series.

3. The control system of claim 2 wherein said lamp is connectable across said capacitor.

4. The control system of claim 1 wherein said oscillating circuit includes two switching transistors, connected in series, and a regenerative base-drive transformer to alternately provide base drive to each of said switching transistors.

5. The control system of claim 1, wherein the frequency away from said peak response frequency of said driving voltage is about 37 kHz and said peak response frequency of said resonant circuit is about 40 kHz.

6. The control system of claim 1 wherein the voltage across said output terminals is approximately between 100 V and 1000 V.

7. A control system for providing electrical power from a source to a gas discharge lamp, comprising:
    a) a ballast connected between said source and said lamp to provide a first current at a first frequency from said source to said lamp, substantially determining the power thereto;
    b) means connected between said source and said lamp, said means having a resonant circuit connected in parallel with said lamp to simultaneously and continuously provide a second current at a second frequency, higher than said first frequency and corresponding to the peak response frequency of said resonant circuit, from said source to said lamp to strike and maintain an electric discharge therein; and
    c) a first inductor connected between said lamp and said ballast to substantially block said second current from propagating through said ballast.

8. The control system of claim 7, wherein said ballast comprises a leakage reactance auto-transformer.

9. The control of claim 7 wherein said resonant circuit comprises a capacitor and a second inductor connected in series.

10. The control system of claim 7 wherein said second frequency is approximately between 20 kHz and 50 kHz.

11. The control system of claim 7 wherein said inductor has an inductance approximately between 20 mH and 100 mH.

12. A control system for providing electrical power from a source to a gas discharge lamp, comprising:
    a) a resonant circuit having input and output terminals, said lamp connectable across said output terminals to provide parallel loading of said resonant circuit;
    b) driving means for providing a high-frequency driving voltage across said input terminals to acheive a resonant response, having a predetermined peak voltage value, in said reasonant circuit and produce a voltage on said output terminals sufficient to strike and maintain an electric discharge in said lamp;
    c) means connected to said resonant circuit for sensing when said resonant response exceeds said predetermined peak voltage value; and
    d) means connected to said driving means and responsive to said sensing means for shifting the frequency of said driving voltage away from the peak response frequency of said resonant circuit when said resonant response exceeds said predetemined peak voltage value; whereby the voltage across said output terminals remains below a predetermined maximum value.

13. The control system of claim 12 wherein said resonant circuit comprises a capacitor and an inductor connected in series.

14. The control system of claim 13 wherein said lamp is connectable across said capacitor.

15. The control system of claim 12 wherein said driving means comprises an oscillating circuit including a switching transistor controlled by a regenerative base-drive transformer.

16. The control system of claim 12 wherein the frequency of said driving voltage is approximately between 20 kHz and 50 kHz.

17. The control system of claim 12 wherein said said sensing means comprises a resistor in series with said resonant circuit and a transistor having its base connected to a first terminal of said resistor and its emitter connected to a second terminal of said resistor.

18. The control system of claim 17 wherein said driving means comprises a regenerative base-drive transformer and said frequency shifting means comprises a secondary winding of said transformer connected in series with said transistor to load said driving means when said transistor is conductive.

19. A control system for providing electrical powers from a source to two gas discharge lamps, comprising:
   a) a pair of ballasts, each connected between said source and a corresponding one of said lamps, to provide a first current at a first frequency from said source to said lamps in parallel, substantially determining the power thereto;
   b) a resonant circuit connected between said source and said lamps to simultaneously and continuously provide a second current at a second frequency, higher than said first frequency, from said source to said lamps in series to strike and maintain an electric discharge therein;
   c) driving means to provide a driving voltage across said resonant circuit sufficient to achieve a resonant response therein; and
   d) first and second inductors, each connected between one of said lamps and said corresponding ballast, to substantially block said second current from propagating through said ballasts.

20. The control system of claim 19 wherein said ballasts comprise leakage reactance auto-transformers.

21. The control system of claim 19 wherein said resonant circuit comprises a capacitor and a third inductor connected in series.

22. The control system of claim 21 wherein said lamps are connectable in series across said capacitor.

23. The control system of claim 19 wherein said driving means comprises an oscillating circuit including a switching transistor controlled by a regenerative base-drive transformer.

24. The control system of claim 19 wherein said second frequency is approximately between 20 kHz and 50 kHz.

25. The control system of claim 19 wherein said first and second inductors each have an inductance approximately between 20 mH and 100 mH.

26. The control system of claim 19 further comprising a capacitor connected between said first and second inductors.

* * * * *